US012644701B1

(12) United States Patent
Soldner et al.

(10) Patent No.: US 12,644,701 B1
(45) Date of Patent: Jun. 2, 2026

(54) SURFACE TEXTURE DETECTION AND EMULATION

(71) Applicant: Apple Inc., Cupertino, CA (US)

(72) Inventors: Nicholas C Soldner, Los Altos, CA (US); Arthur Y Zhang, San Jose, CA (US); Simon Fortin-Deschenes, Santa Clara, CA (US); Robert D Silfvast, Belmont, CA (US); Timo Birnschein, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/731,098

(22) Filed: May 31, 2024

Related U.S. Application Data

(60) Provisional application No. 63/511,575, filed on Jun. 30, 2023.

(51) Int. Cl.
 *G01B 21/30* (2006.01)
 *G08B 6/00* (2006.01)
(52) U.S. Cl.
 CPC .............. *G01B 21/30* (2013.01); *G08B 6/00* (2013.01)
(58) Field of Classification Search
 CPC .................................. G01B 21/30; G08B 6/00
 See application file for complete search history.

(56) References Cited

U.S. PATENT DOCUMENTS

| | | | | |
|---|---|---|---|---|
| 6,042,555 A | * | 3/2000 | Kramer ................... | G06F 3/014 |
| | | | | 600/595 |
| 8,988,445 B2 | * | 3/2015 | Kuchenbecker ...... | G06F 3/0346 |
| | | | | 345/157 |
| 9,468,847 B2 | * | 10/2016 | Bekri .................... | A63F 13/285 |
| 10,296,086 B2 | * | 5/2019 | Rimon .............. | G02B 27/0172 |
| 10,317,199 B2 | * | 6/2019 | Zhao ...................... | H04N 23/56 |
| 11,198,339 B2 | | 12/2021 | Stasio et al. | |
| 2008/0226134 A1 | * | 9/2008 | Stetten .................. | G06F 3/0317 |
| | | | | 340/407.1 |
| 2009/0278798 A1 | * | 11/2009 | Kim ........................ | G06F 3/017 |
| | | | | 345/158 |

(Continued)

OTHER PUBLICATIONS

Lillian Goodwin, "Haptics Device Creates Realistic Virtual Textures," USCViterbi School of Engineering, May 20, 2022, retrieved from https://viterbischool.usc.edu/news/2022/05/virtual-textures-i-cant-believe-its-not-wood/, pp. 1-4.

(Continued)

*Primary Examiner* — Fernando Alcon
(74) *Attorney, Agent, or Firm* — Robert C. Kowert; Kowert, Hood, Munyon, Rankin & Goetzel, P.C.

(57) ABSTRACT

A hand-held device that includes sensor components that enable the detection and measurement of surface features such as roughness or texture. Motion data (e.g., velocity and trajectory) may also be captured. The hand-held device may also include components for emulating surface features. The hand-held device may also recreate, cancel, or alter curves or roughness on virtual or real surfaces, and recreate or cancel curves or roughness on real surfaces. A hand-held device may include the sensor components, the emulation components, or both. The hand-held device may, for example, be used as an accessory in an extended reality (XR) system, or may be a standalone device.

20 Claims, 10 Drawing Sheets

(56) References Cited

U.S. PATENT DOCUMENTS

| | | | | |
|---|---|---|---|---|
| 2015/0331488 A1* | 11/2015 | Grant | G06F 3/014 | |
| | | | | 715/702 |
| 2015/0355710 A1* | 12/2015 | Modarres | G09G 5/003 | |
| | | | | 345/173 |
| 2016/0274662 A1* | 9/2016 | Rimon | G06F 3/16 | |
| 2017/0220112 A1* | 8/2017 | Nakamura | B06B 1/0611 | |
| 2017/0303853 A1* | 10/2017 | McMillen | A61B 5/6843 | |
| 2018/0356893 A1* | 12/2018 | Soni | G06F 3/014 | |
| 2019/0138099 A1* | 5/2019 | Birnbaum | G09B 21/003 | |
| 2019/0187819 A1* | 6/2019 | Ullrich | G06F 3/0354 | |
| 2019/0206134 A1* | 7/2019 | Devam | G06F 3/011 | |
| 2019/0339777 A1* | 11/2019 | Araújo | G06F 3/011 | |
| 2020/0134856 A1* | 4/2020 | Chapman | G06T 7/70 | |
| 2020/0142485 A1* | 5/2020 | Ma | B32B 5/026 | |
| 2020/0174583 A1* | 6/2020 | Wang | G06F 3/011 | |
| 2022/0099436 A1* | 3/2022 | Chen | G01B 9/02097 | |
| 2023/0230296 A1* | 7/2023 | Duffy | G06F 3/016 | |
| | | | | 345/582 |
| 2024/0134456 A1* | 4/2024 | Wolf | G06F 3/03543 | |
| 2024/0419252 A1* | 12/2024 | Amedi | G08B 6/00 | |

OTHER PUBLICATIONS

MSI Viking total Metrology Solutions, Mitutoyo SJ-210 178-561-12 Portable Surftest Standard Drive 4mN, retrieved from https://www.msi-viking.com/Mitutoyo-SJ-210-178-561-12A-Portable-Surftest-S, MSI Viking © 2025, pp. 1-4.

* cited by examiner

100

200

300

400

Smooth
540

Repeatable Roughness
542

Random Roughness
544

Start

Collect sensor data
900

Analyze sensor data to determine surface features
910

Determine effect(s) to be applied to a target surface based on the surface features
920

Apply the effect(s) via the haptic engine and/ or the linear actuator as the device is used on the target surface
930

SURFACE TEXTURE DETECTION AND EMULATION

PRIORITY APPLICATION

This application claims benefit of priority to U.S. Provisional Application Ser. No. 63/511,575, entitled "Surface Texture Detection and Emulation," filed Jun. 30, 2023, and which is hereby incorporated herein by reference in its entirety.

BACKGROUND

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

There are conventional devices that can collect and transmit information about surface roughness or texture. However, this is typically done with expensive optical or tactile sensor systems that are not capable of fitting into small form factor devices. Further, estimation of surfaces roughness is possible using conventional computer vision, aided by machine learning, but may not be accurate at the local scale of the surface.

SUMMARY

Various embodiments of methods and apparatus for surface roughness measurement and emulation are described. Embodiments of a hand-held device (which may be similar to a stylus, such as a pencil or pen) are described that include sensor components that enable the detection and measurement of surface features such as roughness or texture. Embodiments of a hand-held device are also described that include components for emulating surface features. Embodiments may include either the sensor components, the emulation components, or both. The hand-held device may, for example, be used as an accessory in an extended reality (XR) system, or may be a standalone device in some applications.

Some embodiments of the hand-held device may, for example, be used for measuring surface roughness through one or more optical or vibratory sensing mechanisms (sensors), including but not limited to force sensors, accelerometers, interferometers, depth sensors and cameras. Some embodiments may be capable of recreating, altering or cancelling surface roughness of real surfaces via emulation components including but not limited to solid-state haptic components and linear actuator components. Some embodiments may be capable of recreating or cancelling curves in real surfaces via the emulation components.

XR applications that use stylus (pencil/marker) or similar hand-held devices may benefit from embodiments of the device through its capability of capturing surface roughness and other surface features, as well as motion data (e.g., trajectory and velocity) of the hand-held device as it moves across the surface, at a higher fidelity than conventional methods, thus enabling increased immersion during XR sessions. Conventionally, estimation of surface roughness or other surface features is possible using computer vision (CV), aided by machine learning, but may not be accurate at the local scale of the surface. Some embodiments may utilize direct sensors, such as interferometric optical or vibration sensors, to enhance the CV estimation by providing higher space and time resolution information than is possible in conventional CV systems.

In some embodiments, enabled by knowledge of the surface roughness, other surface features, and motion data (e.g., trajectory and velocity), a haptic or dynamic mass in the hand-held device can cancel, enhance or alter the perceived roughness as the hand-held device is moved on a surface. In some embodiments, a sufficiently high bandwidth haptic engine can also recreate the feeling of any surface regardless of whether the hand-held device is actually touching a real surface. Additionally, in some embodiments, a high dynamic linear actuator can be used to change the distance between the grip position and surface to emulate curves on a flat surface, or to eliminate curves to create a flat feeling surface. In some embodiments, the high dynamic linear actuator can be used in conjunction with the haptic engine to recreate surface amplitudes beyond the range of the haptic engine alone.

Some embodiments of a hand-held device may include a gyroscope that, for example, allows the pencil to rotate around its long axis for precise control of shaped pen and brush tools. The gyroscope may be used to alter the feeling of a surface differently depending on the roll angle of the device.

BRIEF DESCRIPTION OF THE DRAWINGS

FIG. 5 graphically illustrates examples of types of surfaces to measure and/or emulate, according to some embodiments.

Figure 1:
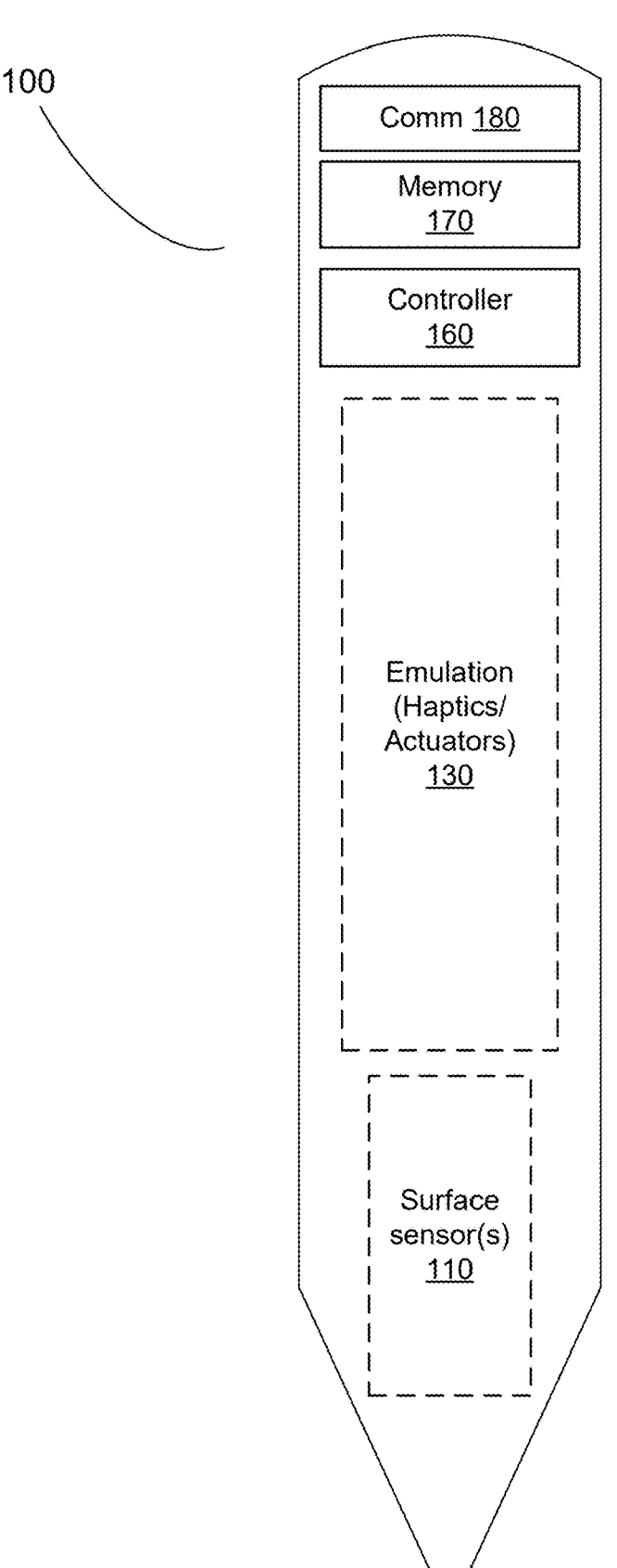
FIG. 1 broadly illustrates a hand-held device, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/ circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for surface roughness measurement and emulation are described. Embodiments of a hand-held device are described that may include sensor components that enable the detection and measurement of surface features such as roughness or texture, as well as motion data (e.g., trajectory and velocity) of the hand-held device as it moves across a surface. Embodiments of a hand-held device are also described that include components for emulating surface features. Embodiments may include either the sensor components, the emulation components, or both. The hand-held device may, for example, be used as an accessory in an extended reality (XR) system, or may be a standalone device in some applications.

FIG. 1 broadly illustrates a hand-held device 100, according to some embodiments. Device 100 may be similar to a stylus, such as a pencil or pen, but other form factors may be used. Device 100 may include, but is not limited to, one or more surface sensors 110 that enable the detection and measurement of surface features such as roughness or texture, as well as motion data (e.g., trajectory and velocity) of the device 100, and one or more emulation components 130 for emulating surface features such as roughness or texture. Embodiments may include either the sensor components 110, the emulation components 130, or both.

Device 100 may also include a controller 160 comprising one or more processors, memory 170, and communication component(s) 180 that enable wired or wireless (e.g., Bluetooth, WIFI, etc.) communications with external devices such as head-mounted devices (HMDs), smartphones, tablet or pad devices, and laptop or desktop computing devices.

Some embodiments of the hand-held device 100 may, for example, be used for measuring surface roughness through one or more optical or vibratory sensing mechanisms (sensors 110), as well as sensors for measuring motion data (e.g., trajectory and velocity) of the device 100, including but not limited to force sensors, accelerometers, interferometers, depth sensors and cameras. Some embodiments of the hand-held device 100 may be capable of recreating, altering, or cancelling surface roughness of real surfaces via emulation components 130 including but not limited to solid-state haptic components and linear actuator components. Some embodiments of the hand-held device 100 may be capable of recreating or cancelling curves in real surfaces via the emulation components 130. Some embodiments may include a gyroscope that may be used to alter the feeling of a surface depending on the roll angle of the device.

Haptic components can create, emulate, or cancel an experience such as friction, texture, or roughness on a surface by applying forces, vibrations, or motions to the user of the device. Linear actuator components can extend or contract a portion of the device, and may for example be used to cancel or recreate curves on a surface.

XR applications that use stylus (pencil/marker) or similar hand-held devices may benefit from embodiments of the device 100 through its capability of capturing surface roughness and other surface features, as well as motion data (e.g., trajectory and velocity) of the device 100, at a higher fidelity than conventional methods, thus enabling increased immersion during XR sessions. Conventionally, estimation of surface roughness or other surface features is possible using computer vision (CV), aided by machine learning, but may not be accurate at the local scale of the surface. Some embodiments may utilize direct sensors, such as interferometric optical or vibration sensors, to enhance the CV estimation by providing higher space and time resolution information than is possible in conventional CV systems.

In some embodiments, enabled by knowledge of the surface roughness, as well as motion data for the device 100 on the surface, a haptic or dynamic mass in the hand-held device 100 can cancel, enhance or alter the perceived roughness as the hand-held device 100 is moved on a surface. In some embodiments, a sufficiently high bandwidth haptic engine can recreate the feeling of any surface regardless of whether the hand-held device 100 is actually touching a real surface. Additionally, in some embodiments, a high dynamic linear actuator can be used to change the distance between the grip position and surface to emulate curves on a flat surface, or to eliminate curves to create a flat feeling surface. In some embodiments, the high dynamic linear actuator can be used in conjunction with the haptic engine to recreate surface amplitudes beyond the range of the haptic engine alone.

Figure 2:
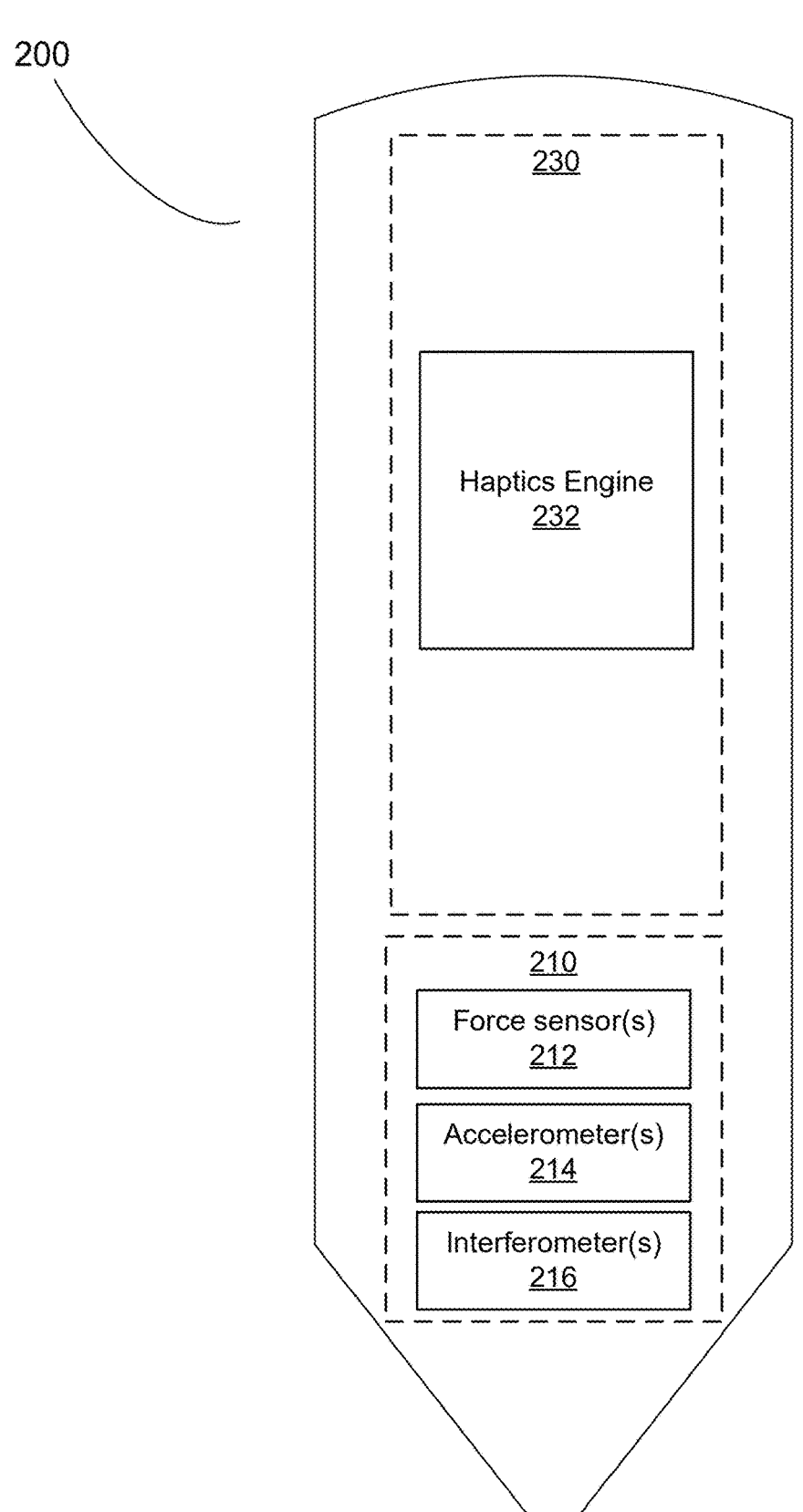
FIG. 2 illustrates a hand-held device that includes surface sensors and haptics, according to some embodiments.

FIG. 2 illustrates a hand-held device 200 that includes surface sensors and haptics, according to some embodiments. Device 200 may include one or more force sensors 212, one or more accelerometers 214, and one or more interferometers 216 that may work separately or together to detect and capture surface data, as well as motion data, that can be analyzed to determine surface roughness and other surface features at a higher fidelity than conventional methods. The determined surface information may, for example, be stored in a surface description. Device 200 may also include a haptic engine 230 that can be used recreate the feeling of any surface regardless of whether the hand-held device 200 is actually touching a real surface, for example based on input from the sensors 210 or from a previously generated surface description.

Figure 3:
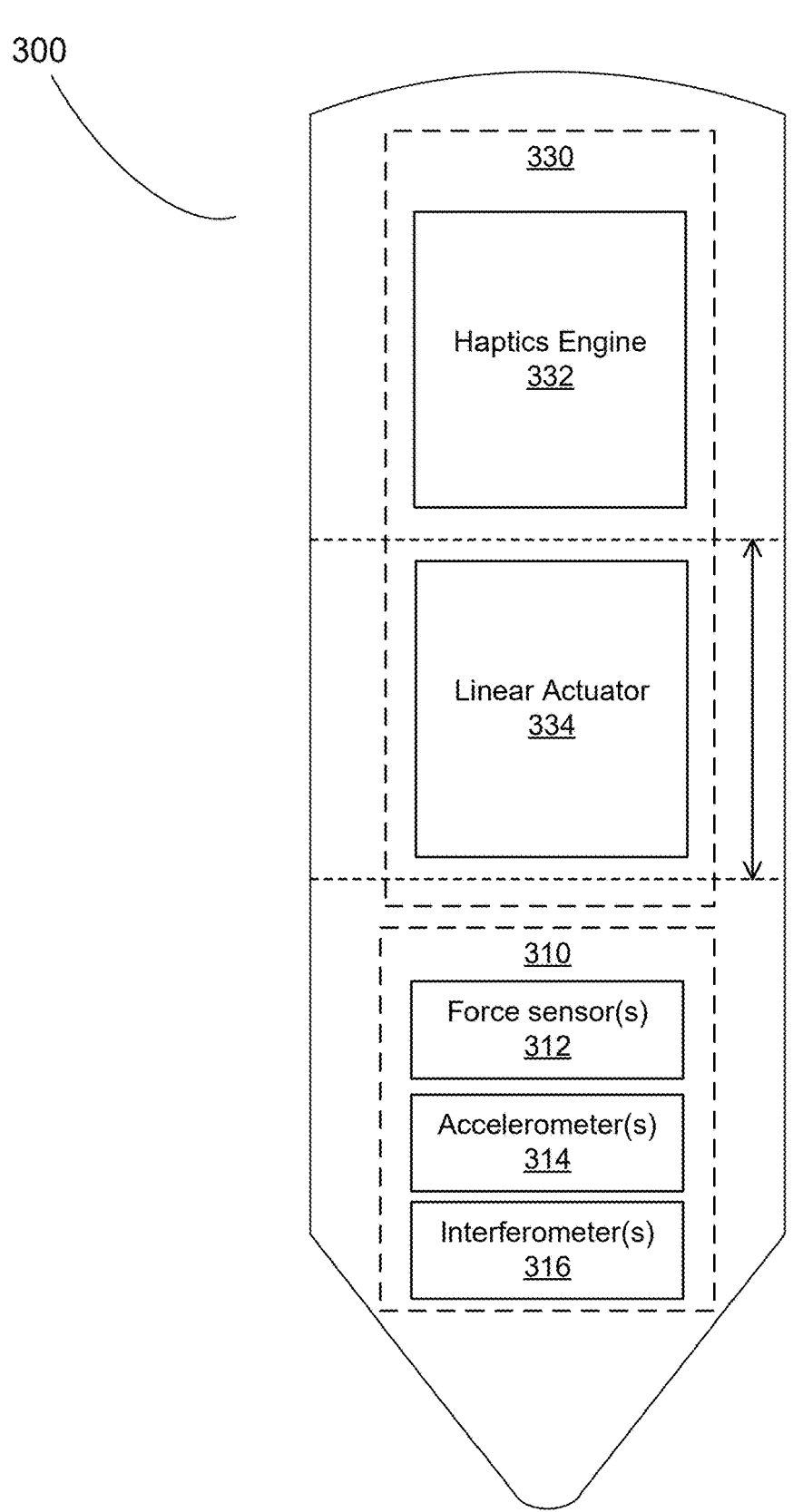
FIG. 3 illustrates a hand-held device that includes surface sensors, haptics, and a linear actuator, according to some embodiments.

FIG. 3 illustrates a hand-held device 300 that includes surface sensors, haptics, and a linear actuator, according to some embodiments. Device 300 may include one or more force sensors 312, one or more accelerometers 314, and one or more interferometers 316 that may work separately or together to detect and capture surface data, as well as motion data, that can be analyzed to determine surface roughness and other surface features at a higher fidelity than conventional methods. The determined surface information may, for example, be stored in a surface description. Device 300 may also include a haptic engine 332 that can be used recreate the feeling of any surface regardless of whether the hand-held device 300 is actually touching a real surface, for example based on input from the sensors 310 or from a previously generated surface description. Device 300 may also include a high dynamic linear actuator 334 that may, for example, be used in recreating or cancelling curves in real surfaces. Linear actuator 334 may, for example, be used to change the distance between the grip position and surface to emulate curves on a flat surface, or to eliminate curves to create a flat feeling surface. In some embodiments, the linear actuator 334 can be used in conjunction with the haptic engine 332 to recreate surface amplitudes beyond the range of the haptic engine alone, or to recreate other surface effects. While not shown, some embodiments may include a gyroscope that may be used to alter the feeling of a surface depending on the roll angle of the device.

Figure 4:
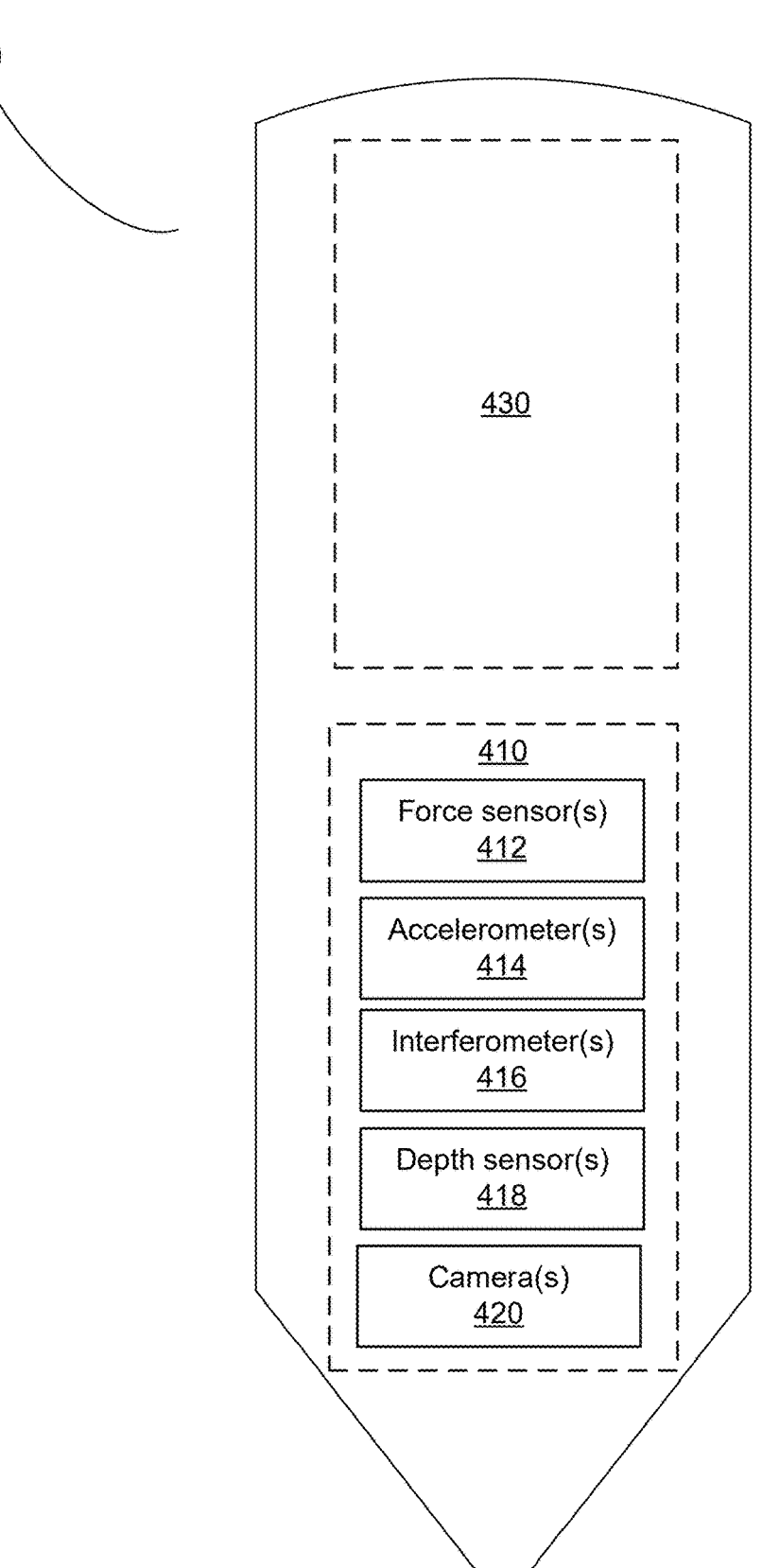
FIG. 4 illustrates a hand-held device that includes depth sensor(s) and cameras in addition to the surface sensors of FIGS. 2 and 3, according to some embodiments.

FIG. 4 illustrates a hand-held device 400 that includes depth sensor(s) and cameras in addition to the surface sensors of FIGS. 2 and 3, according to some embodiments. Device 400 may include one or more force sensors 412, one or more accelerometers 414, and one or more interferometers 416. In some embodiments, a device 400 may also include one or more depth sensors 418, for example implemented as infrared (IR) or near-infrared (NIR) light sources and receivers (e.g., IR/NIR structured light depth camera (s)). In some embodiments, a device 400 may also include one or more visible light cameras 420, for example RGB or grayscale cameras, that can capture images of a surface that can be analyzed to detect at least some features of a surface. The cameras 420 may be components of a computer vision (CV) system. Conventionally, estimation of surface roughness or other surface features is possible using CV, aided by machine learning, but may not be accurate at the local scale of the surface. Thus, some embodiments may utilize sensors 412, 414, and 416 to enhance the CV estimation by providing higher space and time resolution information than is possible in conventional CV systems.

Thus, the sensors 410 may work separately or together to detect and capture surface data and motion data (e.g., velocity and trajectory) that can be analyzed to determine surface roughness and other surface features at a higher fidelity than conventional methods. The determined surface information may, for example, be stored in a surface description. Device 400 may also include emulation components 430, for example as illustrated in FIG. 2 or 3.

Figure 5:
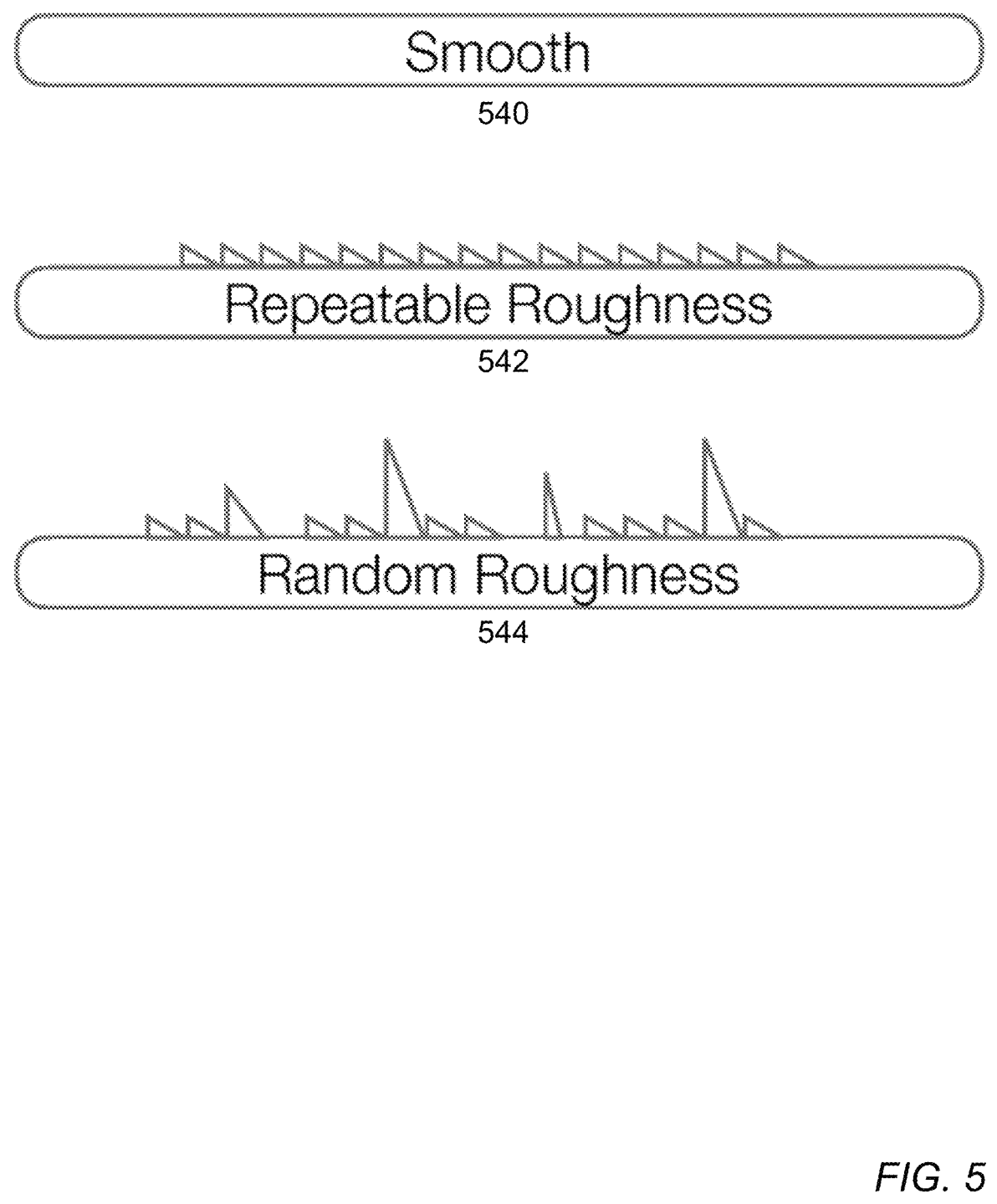

FIG. 5 graphically illustrates examples of types of surfaces to measure and/or emulate, according to some embodiments. A surface may be smooth 540, have repeatable roughness 542, or have random roughness 544. Other surface textures than these are possible, and can be measured and emulated using a hand-held device as illustrated in FIGS. 1 through 4. In addition, other surface metrics may be measured and emulated, including but not limited to softness/hardness, depth and/or width of peaks and valleys, angles/surface normals, friction, curvature, and color. In addition, motion (e.g., trajectory and velocity) of the device as it moves across the surface may be captured. In some embodiments, a measured surface may be classified as a particular surface type, such as rubber, metal, glass, and so on. The classification may be performed on the hand-held device, or alternatively on an external device connected to the hand-held device via a wired or wireless connection. The surface features determined from the measurements made by the surface sensors may be stored in a surface description, which may be stored locally on the hand-held device, or remotely on an external device. A surface description may be associated with a virtual object or objects. The stored surface description can then be accessed to emulate, using the emulation components of the hand-held device, the features of the previously measured surface when drawing on (moving the hand-held device across) a physical or virtual ("in the air") surface. In some embodiments, the surface description information may be sent directly to the emulation components to recreate or compensate for the surface conditions. In some embodiments, a surface description may be transmitted to another hand-held device, where it can be used to emulate the surface that was measured on the first hand-held device.

Figure 6:
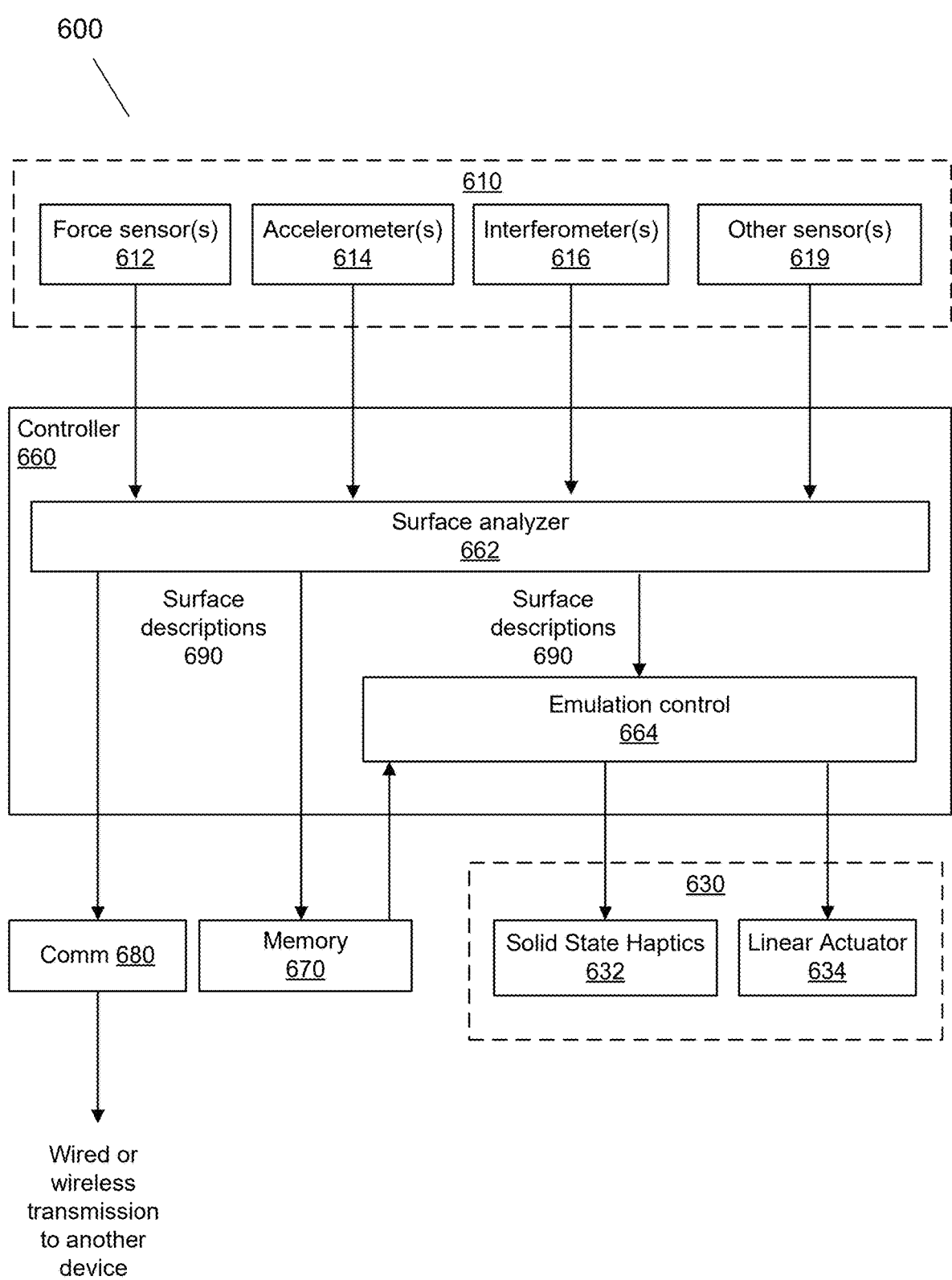
FIG. 6 is a block diagram illustrating components and operations of a hand-held device as illustrated in any of FIGS. 1 through 4, according to some embodiments.

FIG. 6 is a block diagram illustrating components and operations of a hand-held device as illustrated in any of FIGS. 1 through 4, according to some embodiments. A device 600 may include, but is not limited to, surface sensor(s) 610, emulation component(s) 630, a controller 660 comprising one or more processors, memory 670, and one or more communications components 680.

In some embodiments, device 600 may include a controller 660 configured to implement functionality of the device 600 including but not limited to processing data and signals collected by surface sensors 610 and for driving the emulation components 630. In some embodiments, device 600 may also include memory 670 configured to store software of the device that is executable by the controller 660, as well as data that may be generated or used by the controller 660. In some embodiments, device 600 may also include communications components 680 that may implement one or more interfaces (e.g., a Bluetooth technology interface, USB interface, WIFI interface, etc.) configured to communicate with an external device (not shown) via a wired or wireless connection. In some embodiments, at least a part of the functionality described for the controller 660 may be implemented by the external device. The external device may be or may include any type of computing system or computing device, such as a desktop computer, notebook or laptop computer, pad or tablet device, smartphone, hand-held computing device, game controller, game system, and so on.

Controller 660 may include one or more of various types of processors for processing data and signals collected by surface sensors 610 and for driving the emulation components 630. In some embodiments, controller 660 may be integrated in the device 600. In some embodiments, at least some of the functionality of the controller 660 may be implemented by an external device coupled to the device 600 by a wired or wireless connection. In some embodiments, controller 660 may be coupled to an external memory for storing and retrieving data and/or software. In various embodiments, controller 660 may be a uniprocessor system including one processor, or a multiprocessor system including several processors (e.g., two, four, eight, or another suitable number). Controller 660 may include central processing units (CPUs) configured to implement any suitable instruction set architecture, and may be configured to execute instructions defined in that instruction set architecture. For example, in various embodiments controller 660 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 660 may employ any microarchitecture, including scalar, superscalar, pipelined, superpipelined, out of order, in order, speculative, non-speculative, etc., or combinations thereof. Controller 660 may include circuitry to implement microcoding techniques. Controller 660 may include one or more processing cores each configured to execute instructions. Controller 660 may include one or more levels of caches, which may employ any size and any configuration (set associative, direct mapped, etc.).

Memory 670 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used to store processed data, such as Flash or other "hard drive" technologies. While memory 670 is shown as integrated in the device 600, in various embodiments a portion or all of memory 670 may be implemented on an external device.

Surface sensor(s) 610 of a device 600 may include one or more force sensors 612, one or more accelerometers 614, and one or more interferometers 616. In some embodiments, a force sensor 612 may be capable of 1 to 100 gram-force sensing. In some embodiments, an accelerometer 614 may be a high-bandwidth accelerometer capable of detecting 0 Hz to 2.5 kHz vibration signals. In some embodiments, an interferometer 610 may provide ~100 nm resolution absolute depth sensing, 1D or 2D absolute distance, ~100 Hz, and distance to surface of 0 to 1 cm. The parameters given for sensors 612, 614, and 616 are given by way of example; other values or ranges may be used in some embodiments.

In some embodiments, a device 600 may also include one or more other sensors 619, such as one or more depth sensors, for example implemented as infrared (IR) or near-infrared (NIR) light sources and receivers (e.g., IR/NIR structured light depth camera(s)). In some embodiments, other sensors 619 may also include one or more visible light cameras, for example RGB or grayscale cameras, that can capture images of a surface that can be analyzed to detect at least some features of a surface. The cameras may be components of a computer vision (CV) system. Conventionally, estimation of surface roughness or other surface features is possible using CV, aided by machine learning, but may not be accurate at the local scale of the surface. Thus, some embodiments may utilize sensors 612, 614, and 616, and possibly depth sensors, to enhance the CV estimation by providing higher space and time resolution information than is possible in conventional CV systems. In some embodiments, other sensors 619 may include a gyroscope; information from the gyroscope may, for example, be used to alter the feeling of a surface depending on the roll angle of the device.

Emulation component(s) 630 of device 600 may include a haptic engine 632 that can be used recreate the feeling of any surface regardless of whether the hand-held device 600 is actually touching a real surface, for example based on input from the surface sensors 610 or from a previously generated surface description. Emulation component(s) 630 of device 600 may also include a high dynamic linear actuator 634 that may, for example, be used in recreating curves on virtual or real surfaces or cancelling curves in real surfaces. Linear actuator 634 may, for example, be used to change the distance between the grip position and surface to emulate curves on a flat surface, or to eliminate curves to create a flat feeling surface. In some embodiments, the linear actuator 634 can be used in conjunction with the haptic engine 632 to recreate surface amplitudes beyond the range of the haptic engine 630 alone, or to recreate other surface effects.

To measure a physical surface, a tip or end of the device 600 that includes surface sensors 610 may be moved along the surface, either in contact with the surface or near the surface. As shown in FIG. 5, a surface may be smooth, have repeatable roughness, have random roughness, or have other surface textures. In addition, other surface metrics may be measured, including but not limited to softness/hardness, depth and/or width of peaks and valleys, angles/surface normals, friction, curvature, and color. Motion (e.g., velocity and trajectory) may also be measured as the tip of the device 600 is moved along the surface. In some embodiments, a surface analyzer 662 executing on or in the controller may analyze data collected by the surface sensors 610 to classify the surface as a particular surface type, such as rubber, metal, glass, and so on. The classification may be performed on the hand-held device 600, or alternatively at least in part on an external device connected to the hand-held device 600 via a wired or wireless connection. The surface features determined from the measurements made by the surface sensors may be stored in a surface description 690, which may be stored locally in memory 670 on the hand-held device 600, and/or transmitted to and stored remotely on an external device. A surface description 690 may be associated with a virtual object or objects. A stored surface description 690 can be accessed by emulation control 640 executing on or in controller 660 to emulate, by driving the emulation components 650 of the hand-held device 600 appropriately, the features of the previously measured surface when drawing on (moving the hand-held device across) a physical or virtual ("in the air") surface. In some embodiments, the surface description 690 information may be sent directly from surface analyzer 662 to emulation control 664 to recreate or compensate for the surface conditions of the surface being measured. In some embodiments, a surface description 690 may be transmitted to another hand-held device via communications component(s) 680, where it can be used to emulate the surface that was measured on the first hand-held device 600.

Figure 7:
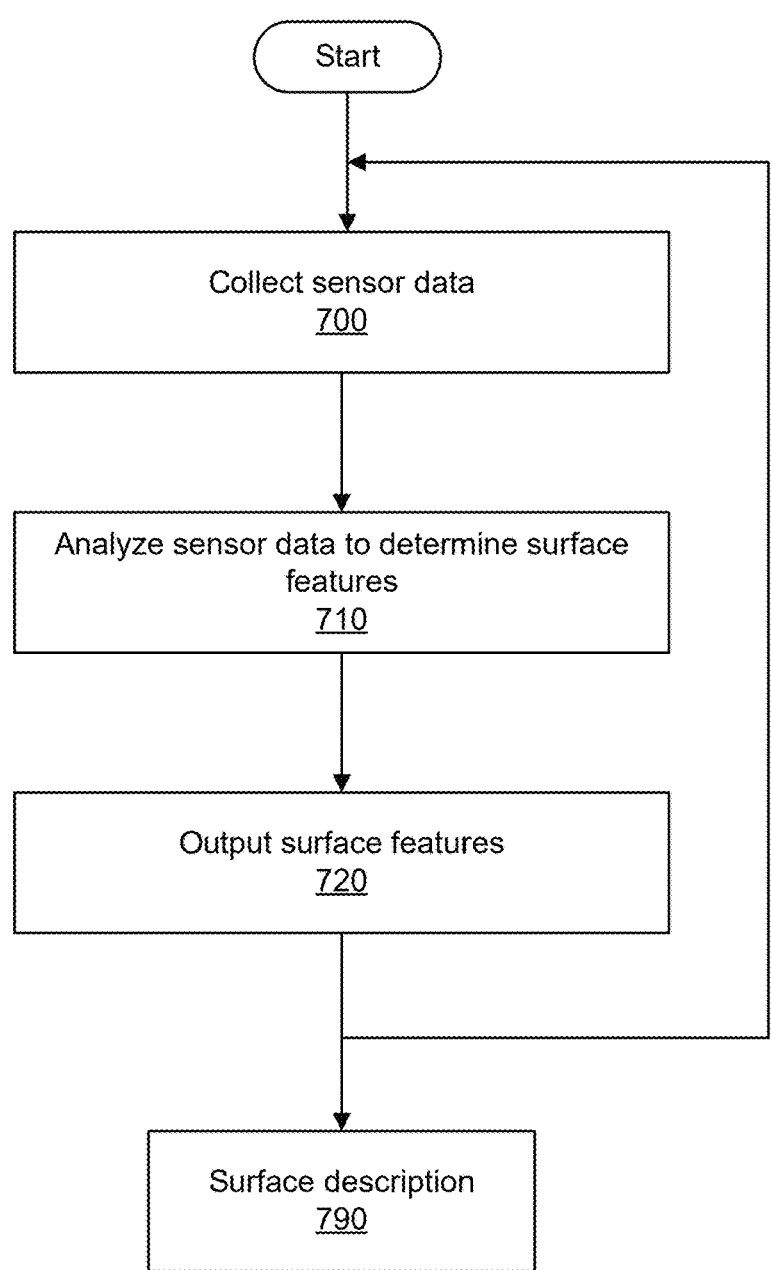
FIG. 7 is a high-level flowchart of a surface texture detection method, according to some embodiments.

FIG. 7 is a high-level flowchart of a surface texture detection method, according to some embodiments. The method of FIG. 7 may, for example, be implemented by any of the hand-held devices as illustrated in FIGS. 1 through 4 and FIG. 6. As indicated at 700, sensor data is collected by surface sensors of a hand-held device as a tip of the device is moved over a surface being measured. The sensor data may be received by a surface analyzer of the device. As indicated at 710, the sensor data is analyzed to determine features of the surface, for example as illustrated in FIG. 5. At 720, a surface description 790 may be output. A surface description 790 may be stored to memory, transmitted to another device, and/or passed directly to emulation control functionality of the hand-held device. As indicated by the arrow returning from 720 to 700, the method may be repeated to measure different surfaces or different portions of a surface.

Figure 8:
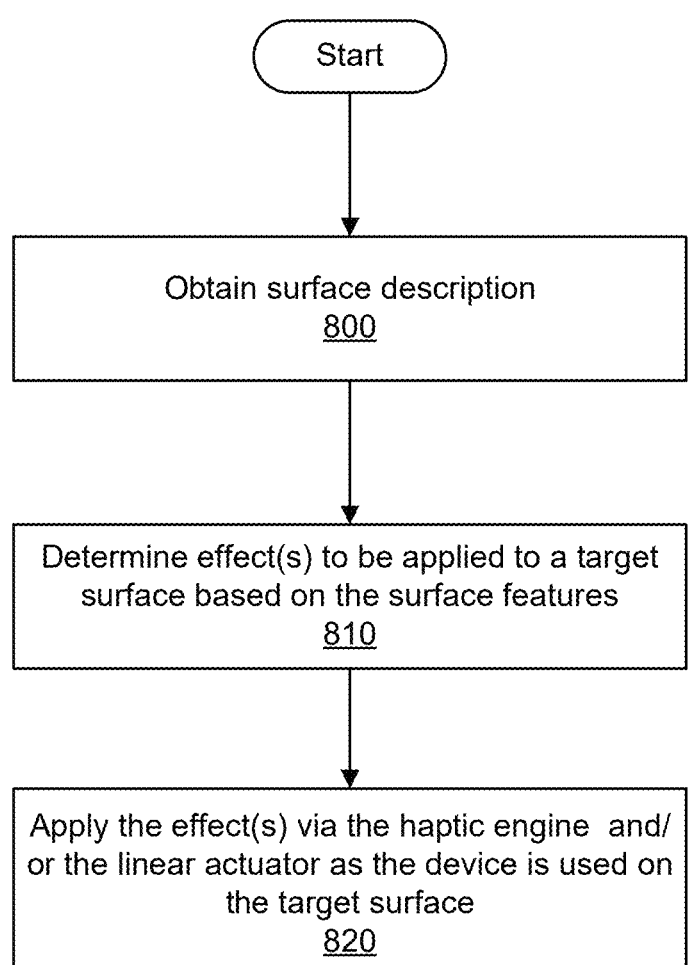
FIG. 8 is a high-level flowchart of a surface texture emulation method, according to some embodiments.

FIG. 8 is a high-level flowchart of a surface texture emulation method, according to some embodiments. The method of FIG. 8 may, for example, be implemented by any of the hand-held devices as illustrated in FIGS. 1 through 4 and FIG. 6. As indicated at 800, a surface description may be obtained, for example by emulation control functionality of the hand-held device. The surface description may be retrieved from memory, received from another device via a wired or wireless connection, or received directly from a surface analyzer component of the hand-held device. As indicated at 810, a surface effect or effects to be emulated may be determined at least in part from the surface description. For example, a surface effect may be to recreate, alter, or cancel roughness on a target surface, or to recreate or cancel a curve on a real surface. As indicated at 820, the determined surface effect(s) may be applied using a haptic engine and/or a linear actuator of the hand-held device as the device is used on or passed over a target surface. Note that a target surface may be a virtual or a physical surface.

In some embodiments, in addition to emulating surface features, a method similar to that shown in FIG. 8 may be used to recreate or cancel curves in real surfaces using the emulation components. In some embodiments, a high dynamic linear actuator can be used to change the distance between the grip position and surface to emulate curves on a flat surface, or to eliminate curves to create a flat feeling surface. In some embodiments, the high dynamic linear actuator can be used in conjunction with the haptic engine to recreate surface amplitudes beyond the range of the haptic engine alone.

In some embodiments, the device may include a gyroscope; information from the gyroscope may, for example, be used to alter the feeling of a surface depending on the roll angle of the device.

Figure 9:
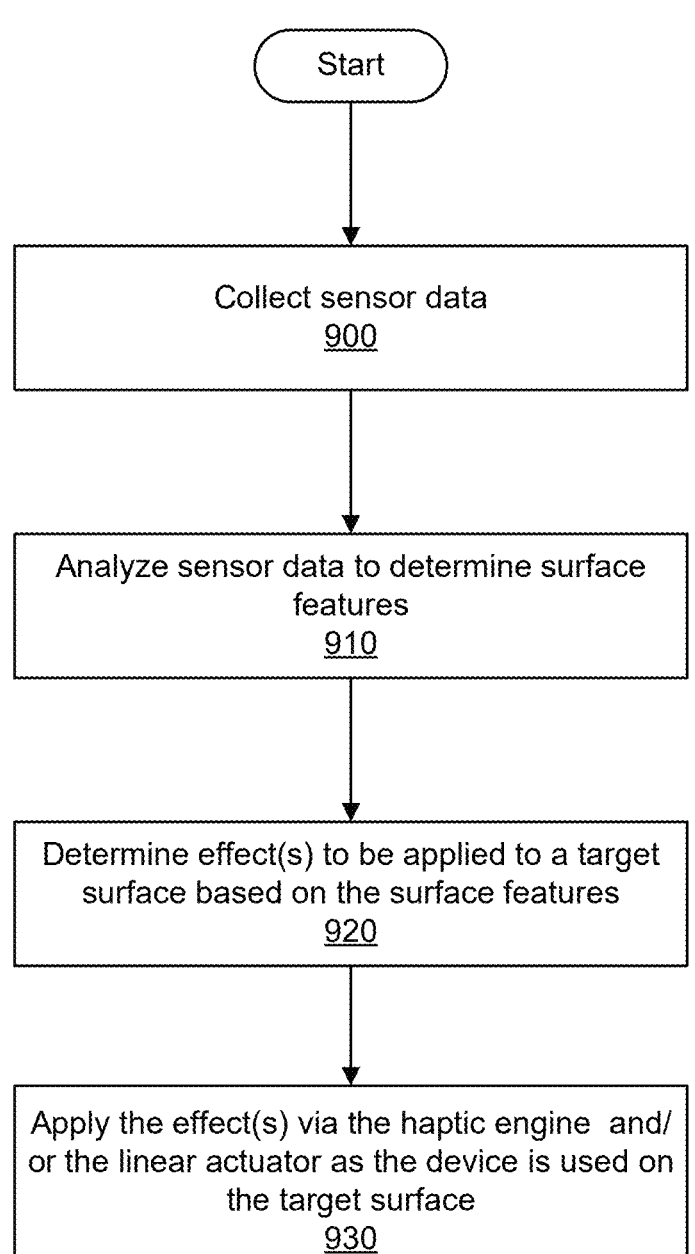
FIG. 9 is a high-level flowchart of a method combining surface texture detection and emulation, according to some embodiments.

FIG. 9 is a high-level flowchart of a method that combines surface texture detection and surface texture emulation, according to some embodiments. The method of FIG. 9 may, for example, be implemented by any of the hand-held devices as illustrated in FIGS. 1 through 4 and FIG. 6. As indicated at 900, sensor data is collected by surface sensors of a hand-held device as a tip of the device is moved over a surface being measured. The sensor data may be received by a surface analyzer of the device. As indicated at 910, the sensor data is analyzed to determine features of the surface, for example as illustrated in FIG. 5. As indicated at 920, a surface effect or effects to be emulated may be determined at least in part from the surface description. For example, a surface effect may be to recreate, alter, or cancel roughness on a target surface, or to recreate or cancel a curve on a real surface. As indicated at 930, the determined surface effect(s) may be applied using a haptic engine and/or a linear actuator of the hand-held device as the device is used on or passed over a target surface. Note that a target surface may be a virtual or a physical surface.

In some embodiments, in addition to emulating surface features, a method similar to that shown in FIG. 9 may be used to recreate or cancel curves in real surfaces using the emulation components. In some embodiments, a high dynamic linear actuator can be used to change the distance between the grip position and surface to emulate curves on a flat surface, or to eliminate curves to create a flat feeling surface. In some embodiments, the high dynamic linear actuator can be used in conjunction with the haptic engine to recreate surface amplitudes beyond the range of the haptic engine alone.

In some embodiments, the device may include a gyroscope; information from the gyroscope may, for example, be used to alter the feeling of a surface depending on the roll angle of the device.

Figure 10:
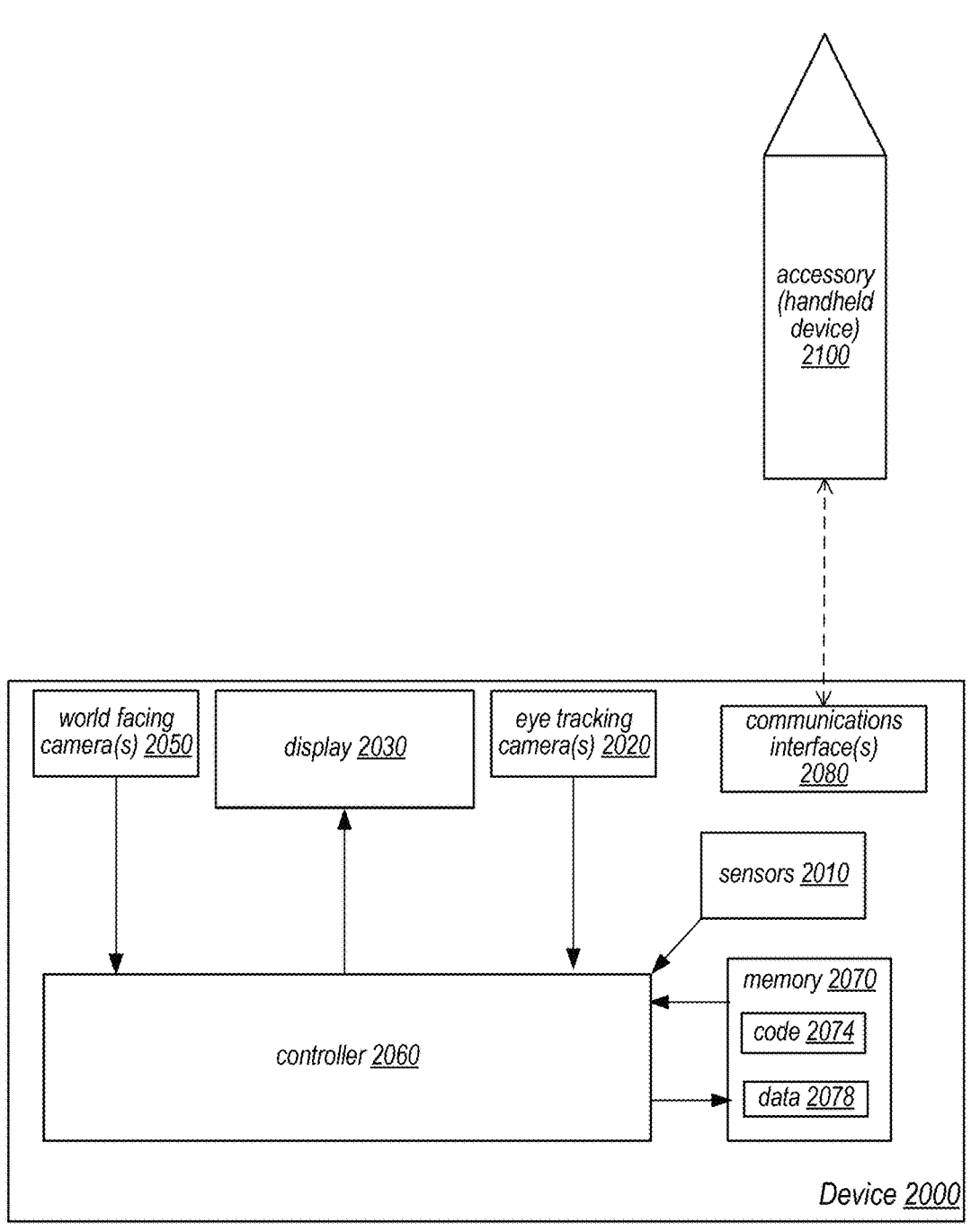
FIG. 10 is a block diagram illustrating an example system that may include components and implement methods as illustrated in FIGS. 1 through 9, according to some embodiments.

FIG. 10 is a block diagram illustrating an example system that may include components and implement methods as illustrated in FIGS. 1 through 9, according to some embodiments.

In some embodiments, an XR system may include a device 2000 such as a headset, helmet, goggles, or glasses. Device 2000 may implement any of various types of display technologies. For example, device 2000 may include a transparent or translucent display 2060 (e.g., eyeglass lenses) through which the user may view the real environment and a medium integrated with display 2060 through which light representative of virtual images is directed to the wearer's eyes to provide an augmented view of reality to the wearer.

In some embodiments, device 2000 may include a controller 2060 configured to implement functionality of the XR system and to generate frames (each frame including a left and right image) that are provided to display 2030. In some embodiments, device 2000 may also include memory 2070 configured to store software (code 2074) of the XR system that is executable by the controller 2060, as well as data 2078 that may be used by the XR system when executing on the controller 2060. In some embodiments, memory 2070 may also be used to store video captured by camera 2050. In some embodiments, device 2000 may also include one or more interfaces 2080 (e.g., a Bluetooth technology interface, USB interface, WIFI interface, etc.) configured to communicate with an external device or devices via a wired or wireless connection. In some embodiments, at least a part of the functionality described for the controller 2060 may be implemented by an external device. An external device may be or may include any type of computing system or computing device, such as a desktop computer, notebook or laptop computer, pad or tablet device, smartphone, hand-held computing device, game controller, game system, and so on. In this example, an embodiment of a hand-held device

2100 as illustrated in any of FIGS. 1 through 9 is shown as connected to device 2000 via a wired or wireless connection.

In various embodiments, controller 2060 may be a uniprocessor system including one processor, or a multiprocessor system including several processors (e.g., two, four, eight, or another suitable number). Controller 2060 may include central processing units (CPUs) configured to implement any suitable instruction set architecture, and may be configured to execute instructions defined in that instruction set architecture. For example, in various embodiments controller 2060 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2060 may employ any microarchitecture, including scalar, superscalar, pipelined, superpipelined, out of order, in order, speculative, non-speculative, etc., or combinations thereof. Controller 2060 may include circuitry to implement microcoding techniques. Controller 2060 may include one or more processing cores each configured to execute instructions. Controller 2060 may include one or more levels of caches, which may employ any size and any configuration (set associative, direct mapped, etc.). In some embodiments, controller 2060 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2060 may include one or more other components for processing and rendering video and/or images, for example image signal processors (ISPs), coder/decoders (codecs), etc.

Memory 2070 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used to store processed data, such as Flash or other "hard drive" technologies.

In some embodiments, device 2000 may include one or more sensors 2010 that collect information about the user's environment (video, depth information, lighting information, head motion and pose information etc.). The sensors 2010 may provide the information to the controller 2060 of the XR system. In some embodiments, the sensors 2010 may include, but are not limited to, at least one visible light camera (e.g., an RGB video camera) 2050, ambient light sensors, an IMU (inertial measurement unit), and at least on eye tracking camera 2020. In some embodiments, device 2000 may also include one or more IR light sources; light from the light sources reflected off the eye may be captured by the eye tracking camera 2020. Gaze tracking algorithms implemented by controller 2060 may process images or video of the eye captured by the camera 2020 to determine eye pose and gaze direction. In some embodiments, the sensors 2010 may include a gyroscope; information from the gyroscope may, for example, be used to alter the feeling of a surface depending on the roll angle of the device.

In some embodiments, device 2000 may be configured to render and display frames to provide an augmented or mixed reality (MR) view for the user based at least in part according to sensor inputs, including input from the eye tracking camera 2020. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by the XR system and composited with the displayed view of the user's real environment.

An embodiment of a hand-held device 2100 as illustrated in any of FIGS. 1 through 9 is shown as connected to device 2000 via a wired or wireless connection. Surface sensor technology of device 2100 may be used in or with the XR system to measure features, including but not limited to texture and roughness, of physical surfaces, for example as illustrated in FIG. 5. In addition, recorded surface descriptions may be used to emulate surface features via emulation technology of device 2100 when "drawing" with device 2100 on physical or virtual surfaces. Emulation technology of device 2100 may also be used in recreating curves or roughness on virtual or real surfaces, or in cancelling curves or roughness on real surfaces.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

Embodiments of the present disclosure may be described in view of the following clauses:

Clause 1. A hand-held device, comprising:

one or more surface sensors configured to collect data about a surface as the hand-held device is passed over the surface; and a controller comprising one or more processors configured to:

analyze the collected data to determine features of the surface; and generate a surface description for the surface, wherein the surface description includes indications of the features of the surface.

Clause 2. The hand-held device as recited in clause 1, wherein the one or more surface sensors include one or more of a force sensor, an accelerometer, and an interferometer.

Clause 3. The hand-held device as recited in clause 2, wherein the one or more surface sensors further include one or more of a depth sensor and a visible light camera.

Clause 4. The hand-held device as recited in clause 1, wherein, to analyze the collected data to determine features of the surface, the controller is configured to classify the surface as a surface type based on the determined features.

Clause 5. The hand-held device as recited in clause 1, wherein features of a surface include one or more of roughness, hardness, depth and width of peaks and valleys, angles, surface normals, friction, curvature, and color.

Clause 6. The hand-held device as recited in clause 1, wherein the surface sensors include a high-bandwidth accelerometer capable of detecting 0 Hz to 2.5 kHz vibration signals.

Clause 7. The hand-held device as recited in clause 1, wherein the surface sensors include a force sensor capable of 1 to 100 gram-force sensing.

Clause 8. The hand-held device as recited in clause 1, wherein the surface sensors include an interferometer that provides ~100 nm resolution absolute depth sensing, 1D or 2D absolute distance, ~100 Hz, and distance to surface of 0 to 1 cm.

Clause 9. The hand-held device as recited in clause 1, wherein the hand-held device further comprises one or more emulation components, and wherein the controller is further configured to recreate, alter, or cancel the features of the surface via the emulation components.

Clause 10. The hand-held device as recited in clause 9, wherein the emulation components include a haptic engine and a linear actuator.

Clause 11. The hand-held device as recited in clause 1, wherein the collected data includes velocity and trajectory of the hand-held device.

Clause 12. The hand-held device as recited in clause 1, wherein the hand-held device is a component of an extended reality (XR) system.

Clause 13. A method, comprising:

collecting, by one or more surface sensors of a hand-held device, data about a surface as the hand-held device is passed over the surface;

analyzing, by a controller comprising one or more processors, the collected data to determine features of the surface; and generating a surface description for the surface, wherein the surface description includes indications of the features of the surface.

Clause 14. The method as recited in clause 13, wherein the one or more surface sensors include one or more of a force sensor, an accelerometer, and an interferometer.

Clause 15. The method as recited in clause 14, wherein the one or more surface sensors further include one or more of a depth sensor and a visible light camera.

Clause 16. The method as recited in clause 13, wherein, analyzing the collected data to determine features of the surface comprises classifying the surface as a surface type based on the determined features.

Clause 17. The method as recited in clause 13, wherein features of a surface include one or more of roughness, hardness, depth and width of peaks and valleys, angles, surface normals, friction, curvature, and color.

Clause 18. The method as recited in clause 13, wherein the surface sensors include:

a high-bandwidth accelerometer capable of detecting 0 Hz to 2.5 kHz vibration signals;

a force sensor capable of 1 to 100 gram-force sensing; and an interferometer that provides ~100 nm resolution absolute depth sensing, 1D or 2D absolute distance, ~100 Hz, and distance to surface of 0 to 1 cm.

Clause 19. The method as recited in clause 13, wherein the hand-held device further comprises a haptic engine and a linear actuator, and wherein the controller is further configured to recreate, alter or cancel the features of the surface via the haptic engine and the linear actuator.

Clause 20. The method as recited in clause 13, wherein the collected data includes velocity and trajectory of the hand-held device.

Clause 21. The method as recited in clause 13, wherein the hand-held device and the controller are components of an extended reality (XR) system.

Clause 22. A system comprising:

a hand-held device, comprising one or more surface sensors configured to collect data about a physical surface as the hand-held device is passed over the surface;

a head-mounted device (HMD), comprising a display subsystem configured to display content in a virtual environment; and one or more processors configured to:

analyze the data collected by the surface sensors to classify the surface as a surface type; and recreate the surface type on a surface in the virtual environment.

Clause 23. The system as recited in clause 22, wherein the hand-held device further comprises one or more emulation components, and wherein the one or more processors are further configured to cause the hand-held device to emulate the surface type in the virtual environment via the emulation components.

Clause 24. A hand-held device, comprising:

one or more emulation components; and a controller comprising one or more processors configured to:

obtain features of a surface;

determine, based at least in part on the features of the surface, one or more effects to be applied on a target surface; and cause the one or more emulation components to apply the one or more effects as the hand-held device is passed over the target surface.

Clause 25. The hand-held device as recited in clause 24, wherein the obtained features of the surface include one or more of roughness, hardness, depth and width of peaks and valleys, angles, surface normals, friction, and curvature.

Clause 26. The hand-held device as recited in clause 24, wherein, to cause the one or more emulation components to apply the one or more effects as the hand-held device is passed over the target surface, the controller is configured to use motion data of the hand-held device to determine application of the one or more effects.

Clause 27. The hand-held device as recited in clause 24, wherein the one or more emulation components include a haptic engine, and wherein the effects include recreating, altering, or canceling the surface features on the target surface via the haptic engine.

Clause 28. The hand-held device as recited in clause 27, wherein the one or more emulation components further include a linear actuator, wherein the linear actuator is used in conjunction with the haptic engine to recreate, alter, or cancel the surface features on the target surface.

Clause 29. The hand-held device as recited in clause 24, wherein the one or more emulation components include a linear actuator, and wherein the effects include emulating or canceling a curve on the target surface via the linear actuator.

Clause 30. The hand-held device as recited in clause 24, wherein the hand-held device is a component of an extended reality (XR) system.

Clause 31. A method, comprising:

obtaining, by a controller comprising one or more processors, features of a surface;

determining, based at least in part on the features of the surface, one or more effects to be applied on a target surface; and causing one or more components of a hand-held device to apply the one or more effects as the hand-held device is passed over the target surface.

Clause 32. The method as recited in clause 31, wherein the obtained features of the surface include one or more of roughness, hardness, depth and width of peaks and valleys, angles, surface normals, friction, and curvature.

Clause 33. The method as recited in clause 31, wherein causing one or more components of a hand-held device to apply the one or more effects as the hand-held device is passed over the target surface comprises using motion data of the hand-held device to determine application of the one or more effects.

Clause 34. The method as recited in clause 31, wherein the one or more components include a haptic engine, and wherein causing one or more emulation components of a hand-held device to apply the one or more effects as the hand-held device is passed over the target surface comprises causing the haptic engine to recreate, alter, or cancel the surface features on the target surface.

Clause 35. The method as recited in clause 34, wherein the one or more emulation components further include a linear actuator, further comprising using the linear actuator in conjunction with the haptic engine to recreate, alter, or cancel the surface features on the target surface.

Clause 36. The method as recited in clause 31, wherein the one or more emulation components include a linear actuator, and wherein causing one or more emulation components of a hand-held device to apply the one or more effects as the hand-held device is passed over the target surface comprises causing the linear actuator to emulate or cancel a curve on the target surface.

Clause 37. The method as recited in clause 31, wherein the hand-held device and the controller are components of an extended reality (XR) system.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A hand-held device, comprising:

one or more surface sensors configured to collect data about a surface as the hand-held device is passed over the surface;

a linear actuator configured to change a grip distance from the surface to a grippable portion of the hand-held device; and a controller comprising one or more processors configured to:

analyze the collected data to determine features of the surface;

generate a surface description for the surface, wherein the surface description includes indications of the features of the surface; and control the linear actuator to change the grip distance from the surface to the grippable portion of the hand-held device to simulate a curved surface or alter a curvature of the surface.

2. The hand-held device as recited in claim 1, wherein the one or more surface sensors include one or more of a force sensor, an accelerometer, an interferometer, a depth sensor, and a visible light camera.

3. The hand-held device as recited in claim 1, wherein, to analyze the collected data to determine features of the surface, the controller is configured to classify the surface as a surface type based on the determined features, wherein features of a surface include one or more of roughness, hardness, depth and width of peaks and valleys, angles, surface normals, friction, curvature, and color.

4. The hand-held device as recited in claim 1, wherein the one or more surface sensors include one or more of:

a high-bandwidth accelerometer capable of detecting 0 Hz to 2.5 kHz vibration signals;

a force sensor capable of 1 to 100 gram-force sensing; and an interferometer that provides ~100 nm resolution absolute depth sensing, 1D or 2D absolute distance, ~100 Hz, and distance to surface of 0 to 1 cm.

5. The hand-held device as recited in claim 1, wherein the hand-held device further comprises one or more emulation components, and wherein the controller is further configured to recreate, alter, or cancel the features of the surface via the emulation components.

6. The hand-held device as recited in claim 5, wherein, to recreate, alter, or cancel the features of the surface via the emulation components, the controller is configured to:

obtain features of the surface;

determine, based at least in part on the features of the surface, one or more effects to be applied on a target surface; and cause the one or more emulation components to apply the one or more effects as the hand-held device is passed over the target surface.

7. The hand-held device as recited in claim 6, wherein, to cause the one or more emulation components to apply the one or more effects as the hand-held device is passed over the target surface, the controller is configured to use motion data of the hand-held device to determine application of the one or more effects.

8. The hand-held device as recited in claim 6, wherein the one or more emulation components include a haptic engine, and wherein the effects include recreating, altering, or canceling the surface features on the target surface via the haptic engine.

9. The hand-held device as recited in claim 8, wherein the linear actuator is used in conjunction with the haptic engine to recreate, alter, or cancel the surface features on the target surface.

10. The hand-held device as recited in claim 6, wherein the one or more emulation components include the linear actuator, and wherein the effects include emulating or canceling a curve on the target surface via the linear actuator.

11. The hand-held device as recited in claim 6, further comprising a gyroscope, wherein data collected from the gyroscope is used to alter feeling of a surface depending on roll angle of the device.

12. The hand-held device as recited in claim 1, wherein the collected data includes velocity and trajectory of the hand-held device.

13. The hand-held device as recited in claim 1, wherein the hand-held device is a component of an extended reality (XR) system.

14. A method, comprising:

collecting, by one or more surface sensors of a hand-held device comprising a linear actuator, data about a surface as the hand-held device is passed over the surface;

analyzing, by a controller comprising one or more processors, the collected data to determine features of the surface;

generating a surface description for the surface, wherein the surface description includes indications of the features of the surface; and controlling, based at least in part on the surface description, the linear actuator to change a grip distance from the surface to a grippable portion of the hand-held device to simulate a curved surface or alter a curvature of the surface.

15. The method as recited in claim 14, wherein the one or more surface sensors include one or more of a force sensor, an accelerometer, an interferometer, a depth sensor, and a visible light camera.

16. The method as recited in claim 14, wherein, analyzing the collected data to determine features of the surface comprises classifying the surface as a surface type based on the determined features, wherein features of a surface include one or more of roughness, hardness, depth and width of peaks and valleys, angles, surface normals, friction, curvature, and color.

17. The method as recited in claim 14, wherein the surface sensors include one or more of:

a high-bandwidth accelerometer capable of detecting 0 Hz to 2.5 kHz vibration signals;

a force sensor capable of 1 to 100 gram-force sensing; and an interferometer that provides ~100 nm resolution absolute depth sensing, 1D or 2D absolute distance, ~100 Hz, and distance to surface of 0 to 1 cm.

18. The method as recited in claim 14, further comprising recreating, altering or canceling the features of a surface via one or more emulation components of the device, wherein the emulation components include a haptic engine and the linear actuator.

19. The method as recited in claim 18, wherein recreating, altering or canceling the features of a surface comprises:

obtaining features of the surface;

determining, based at least in part on the features of the surface, one or more effects to be applied on a target surface; and causing the one or more emulation components to apply the one or more effects as the hand-held device is passed over the target surface.

20. A system, comprising:

a hand-held device, comprising a linear actuator and one or more surface sensors configured to collect data about a physical surface as the hand-held device is passed over the surface;

a head-mounted device (HMD), comprising a display subsystem configured to display content in a virtual environment; and one or more processors configured to:

analyze the data collected by the surface sensors to classify the surface as a surface type;

control the linear actuator to change a grip distance from a surface to a greppable portion of the hand-held device to simulate a curved surface or alter a curvature of the surface; and recreate the surface type on a surface in the virtual environment.

* * * * *